US006496630B2

(12) United States Patent
Iwai et al.

(10) Patent No.: US 6,496,630 B2
(45) Date of Patent: Dec. 17, 2002

(54) FINGERPRINT RECOGNITION DEVICE AND FINGERPRINT READING WINDOW CONSTRUCTION

(75) Inventors: Hajimu Iwai, Kyoto (JP); Isao Yoshida, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/799,575

(22) Filed: Mar. 7, 2001

(65) Prior Publication Data

US 2001/0022882 A1 Sep. 20, 2001

(30) Foreign Application Priority Data

Mar. 10, 2000 (JP) ........................................ 2000-067003
Mar. 10, 2000 (JP) ........................................ 2000-067004

(51) Int. Cl.$^7$ ................................................ G02B 6/04
(52) U.S. Cl. ........................................ 385/120; 382/124
(58) Field of Search ........................... 385/120; 382/124, 382/125–27; 356/71; 340/5.1

(56) References Cited

U.S. PATENT DOCUMENTS

| 4,537,484 A | * | 8/1985 | Fowler et al. ................. 356/71 |
| 5,546,471 A | * | 8/1996 | Merjanian ..................... 356/71 |
| 5,619,586 A | * | 4/1997 | Sibbald ........................ 356/71 |
| 6,011,860 A | * | 1/2000 | Fujieda et al. ............... 382/124 |
| 6,144,511 A | * | 11/2000 | Umetsu et al. ................ 356/71 |
| 6,263,090 B1 | * | 7/2001 | Scott et al. .................. 382/124 |
| 6,324,310 B1 | * | 11/2001 | Brownlee ...................... 356/71 |

FOREIGN PATENT DOCUMENTS

JP    A-10-289304    10/1998

* cited by examiner

Primary Examiner—Brian Sircus
Assistant Examiner—Brian S. Webb
(74) Attorney, Agent, or Firm—Dickstein Shapiro Morin & Oshinsky LLP (57) ABSTRACT

To enable easy replacement of a soiled fingerprint reading window. To reduce the number of light sources and achieve miniaturization.

An aperture 5 is formed in part of a case K constituting the outer shell of a fingerprint recognition device, aperture 5 being covered by a cover member 4. Cover member 4 that covers aperture 5 constitutes part of case K. An aperture 6 formed in cover member 4 is covered by a window member 7 for fingerprint reading consisting of an optically transparent member. Window member 7 is arranged on the undersurface of cover member 4 and is resiliently held by the holding feet 11 formed on cover member 4. Light source 42, light-guide plate 43, reflection mirrors 33 and 34, image pick-up lens 35 and image pick-up element 36 are held by holding body H which is fixedly arranged in case K. Window member 7 is clamped between supporting faces 38 of holding body H and cover member 4 so as to be immovable.

Light-guide plate 43 is arranged adjacent and inclined with respect to window member 7. Detection light rays from light-emitting elements 42 are sufficiently diffused while passing through light-guide plate 43 and are emitted in planar fashion from light-guide plate 43 towards window member 7.

25 Claims, 9 Drawing Sheets

FINGERPRINT RECOGNITION DEVICE AND FINGERPRINT READING WINDOW CONSTRUCTION

BACKGROUND OF THE INVENTION

1. Field of the Invention

The present invention relates to a fingerprint recognition device and fingerprint reading window construction.

2. Description of the Related Art

Instead of the use of a password to confirm an authorized person's identity, confirmation of the identity of the authorized person is often made by a fingerprint recognition device used for this purpose. In the case of an optical fingerprint recognition device, the surface irregularities of the fingerprint are converted into variations in optical intensity which are then converted into electrical signals (image signals corresponding to the fingerprint) by an image pick-up element and the electrical signals obtained are compared with the electrical signals for the authorized person, which are stored beforehand, and confirmation of the identity of the authorized person is thereby made. In such an optical fingerprint recognition device, a fingerprint reading window that is contacted by the fingertip is provided, and detection light rays from a light source installed on the inside thereof are directed onto the fingerprint reading window, so that the reflected light from this fingerprint reading window can finally be input to an image pick-up element. An example of disclosure of an optical fingerprint recognition device is to be found in Laid-open Japanese Patent Application Number H. 10-289304; however, in all prior art recognition devices, the fingerprint reading window that is contacted by the finger tip is arranged within the case of the fingerprint recognition device and is fitted in such a way that it cannot easily be removed from outside.

However, the fingerprint reading window easily becomes soiled due to repeated contact with fingertips. In particular, it becomes more liable to become soiled when a coating layer such as a silicone film is formed on the surface in order to emphasize variations of optical intensity produced by surface irregularities of the fingerprint. When the fingerprint reading window becomes soiled, accuracy of reading the fingerprint deteriorates, with an adverse effect on the accuracy of recognition of authorized persons. As a result, although, when the fingerprint reading window has been soiled, consideration might be given to replacing this, conventionally, no provision was made for replacing the window member, so the only alternatives were either to replace the entire fingerprint recognition device or to request the manufacturer of the fingerprint recognition device to replace the window member, in which case the fingerprint recognition device could not be used while replacement was being requested.

On the other hand, the detection light rays that are directed onto the window member for fingerprint reading, due to considerations regarding illumination of the entire fingertip, must be planar emitted light. In order to obtain such planar emitted light, conventionally, a construction was adopted in which a multiplicity of light-emitting elements were arranged in dispersed fashion on a substrate arranged facing the window member.

However, with a construction as conventionally in which a multiplicity of light-emitting elements are arranged in dispersed fashion on a substrate, a multiplicity of expensive light-emitting elements must be employed, making the device as a whole extremely costly, and also resulting in extremely large power consumption. In addition, due to the need to disperse the detection light rays from the light-emitting elements sufficiently, considerable separation must be ensured between the substrate and the window member, resulting in the problem that the fingerprint recognition device becomes quite large.

SUMMARY OF THE INVENTION

The present invention was made in view of the above circumstances, a first object thereof being to provide a fingerprint recognition device wherein a soiled fingerprint reading window can easily be replaced.

A second object of the present invention is to provide a fingerprint-reading window construction that is suitable for a fingerprint-reading window replacement.

A third object of the present inventions is to provide a fingerprint recognition device wherein the number of light sources can be reduced and miniaturization thereby achieved.

It should be noted that the objects of the present invention are not restricted to what is explicitly stated above, but implicitly include the provision of features, to be described, which are essentially desirable or are expressed as advantages.

In order to achieve the above first object, according to the present invention essentially the following technique for solution is adopted. Specifically, as described in Claim 1, part of the case that constitutes the outer shell of the fingerprint recognition device is constituted by a window member for fingerprint reading, which is composed of an optically transparent member that is formed as a separate element from this case, and the above-mentioned window member is removably mounted with respect to the case from outside the above-mentioned case. By adopting such a technique for solution, the window member for fingerprint reading can easily be mounted/removed with respect to the case, with the result that replacement of a soiled window member can easily be performed.

By separately providing the cover member (which also provides a frame member of the window member) having an aperture covered by a window member, this cover member is made to constitute part of the case and can be freely mounted/demounted from outside with respect to the case. If this is done, the window member can be removed from the case by first of all removing the cover member from the case. Since the periphery of the window member, i.e. the cover member, also tends to become soiled by contact with the fingertip, the cover member can also be replaced jointly together with the window member.

A holding part for holding the window member may also be formed on the cover member; if this is done, by holding the window member on the cover member beforehand, mounting of the window member with respect to the case can be achieved by mounting the cover member with respect to the case, and removal of the window member from the case can be achieved by removing the cover member from the case.

A supporting face for supporting the window member may be formed within the case; this is desirable in that it enables the window member that is pressed by the fingertip to be securely received.

Freely demountable mounting of the cover member with respect to the case may be achieved by using the engagement/disengagement of an abutment part provided on the case and an engagement part provided on the cover member; if this is done, the cover member i.e. the window member may be mounted and removed with respect to the case extremely easily without employing a separate fixing element, such as a screw, or a tool for manipulating the fixing element. Such engagement/disengagement of the abutment part and engagement part, i.e. mounting/removal of the cover member with respect to the case, may be performed by causing the cover member to execute a prescribed movement with respect to the case; as this prescribed movement, for example rocking or sliding of the cover member may be suitably selected.

The inner peripheral portion of the aperture in the cover member may be formed with a pair of left and right cut-away apertures to allow passage of light rays for detection of a fingertip.

A fingerprint recognition device according to the present invention may be employed in suitable applications such as use for control of access to a room.

In order to achieve the second object, according to the present invention, the following technique for solution may be adopted. Specifically, as described in Claim 7, a fingerprint reading window is constructed to comprise a window member made of an optically transparent member and a cover member formed with an aperture covered by this window member, and an engagement part for mounting this cover member is formed on the cover member. By adopting such a technique for solution, the window member may be provided for replacement together with the cover member, which provides a frame member at the periphery of the window member. Also, by mounting using an engagement part, the task of replacement is facilitated.

In order to achieve the third object, according to the present invention, the following techniques for solution are adopted. Specifically, as described in Claim 12, in a fingerprint recognition device of the optical type constructed such that detection light rays from a light source are directed onto a window member for fingerprint reading, the fingerprint recognition device has a light-guide plate arranged such that its plate surface faces said window member, the detection light rays from said light source is input from one end face of said light-guide plate and said detection light rays is thereby turned into planar emitted light emitted from the entire plate surface of this light-guide plate. By this technique for solution, detection light rays from the light source are sufficiently diffused while passing through the light-guide plate and are emitted in planar fashion from the entire plate surface of the light-guide plate. Thanks to the diffusion of the detection light rays by the light-guide plate, it becomes possible to employ a small number of light sources, which is advantageous as regards costs and also enables power consumption to be reduced. Also, the separation between the light-guide plate and the fingerprint reading window member can be made closer, making it possible to miniaturize the fingerprint recognition device and in particular making it possible to reduce its thickness.

Preferably the light-guide plate is arranged in inclined fashion with respect to the window member for fingerprint reading; if this is done, a margin can be ensured in respect of the detection light ray path whereby the reflected light from the window member is led to the image pick-up element.

The light-guide plate may comprise a main plate and a surface plate arranged on the surface of this main plate (surface facing the window member); in this case, a multiplicity of grooves may be formed extending in a direction approximately parallel with the input direction of the detection rays from the light source, while being spaced from one another in the direction approximately perpendicular to the input direction of these detection light rays; the diffusion action produced by the light-guide plate is thereby increased, and the detection light rays emitted in planar fashion can be rectified to uniform light rays by the surface plate.

In order to achieve the first and third objects together, the following techniques for solution can be adopted according to the present invention. Specifically, as described in Claim 18, in a fingerprint recognition device of the optical type constructed such that detection light rays from a light source are directed onto a window member for fingerprinting comprising an optically transparent member, and that the detection light rays reflected by the window member are input to an image pick-up element, the window member is formed as a separate element from a case constituting the outer shell of the fingerprint recognition device and is attached removably to the case from outside the case, a light-guide plate is provided such that the plate surface faces the window member, and the detection light rays from the light source are input from one end face of the light-guide plate, whereby the detection light rays are turned into planar emitted light emitted from the entire plate surface of the light-guide plate. By adopting this technique for solution, replacement of the window member for fingerprint reading can be facilitated and the planar emitted light can be obtained while decreasing the number of light sources.

On the preposition that the above technique for solution is adopted, it is preferred that the optical system may be configured as follows. Specifically, a first reflecting mirror for reflecting the detection light rays reflected from the window member is arranged in the direction of extension of the above-mentioned light-guide plate, a second reflecting mirror, for reflecting the detection light rays reflected by the first reflecting mirror towards the image pick-up lens, is arranged below the light-guide plate, and a holding body is arranged below the window member so that the holding member holds the light source, light-guide plate, image pick-up element, image pick-up lens, first reflecting mirror and second reflecting mirror.

As a result of such configuration as above, all the components constituting the optical engine for comparing fingerprints can be held by the holding body, so that the positional relationship among the components can be established with a high precision. In this case, in order to enable the positional and sizing relationship between the window member and the holding body to be established with a high precision as well, it is preferred to provide the above-mentioned holding body with a supporting face for supporting the window member so that the window member is immovably clamped between the supporting face and the cover member in a condition where the cover member is attached to the case.

The case may be a special-purpose case exclusively for a fingerprint recognition device, or the case of another type of equipment in which a fingerprint recognition device is incorporated, such as the keyboard case in an information processing device typified by a notebook personal computer may be effectively utilized without modification.

DETAILED DESCRIPTION OF THE PREFERRED EMBODIMENTS

An example of a fingerprint recognition device to which the present invention is applied is described below with reference to the drawings; first of all, the outline of the present invention is described with reference to FIG. 1 to FIG. 4. A case K constituting the outer shell of the fingerprint recognition device comprises a lower case 1 and an upper case 2 respectively formed by synthetic resin. This lower case 1 and upper case 2 are mutually fixed and unified by means of screws 3 (see FIG. 4) that are mounted or removed from below lower case 1. A space, in which the various components, to be described, are installed, is defined within this case K.

Figure 4:
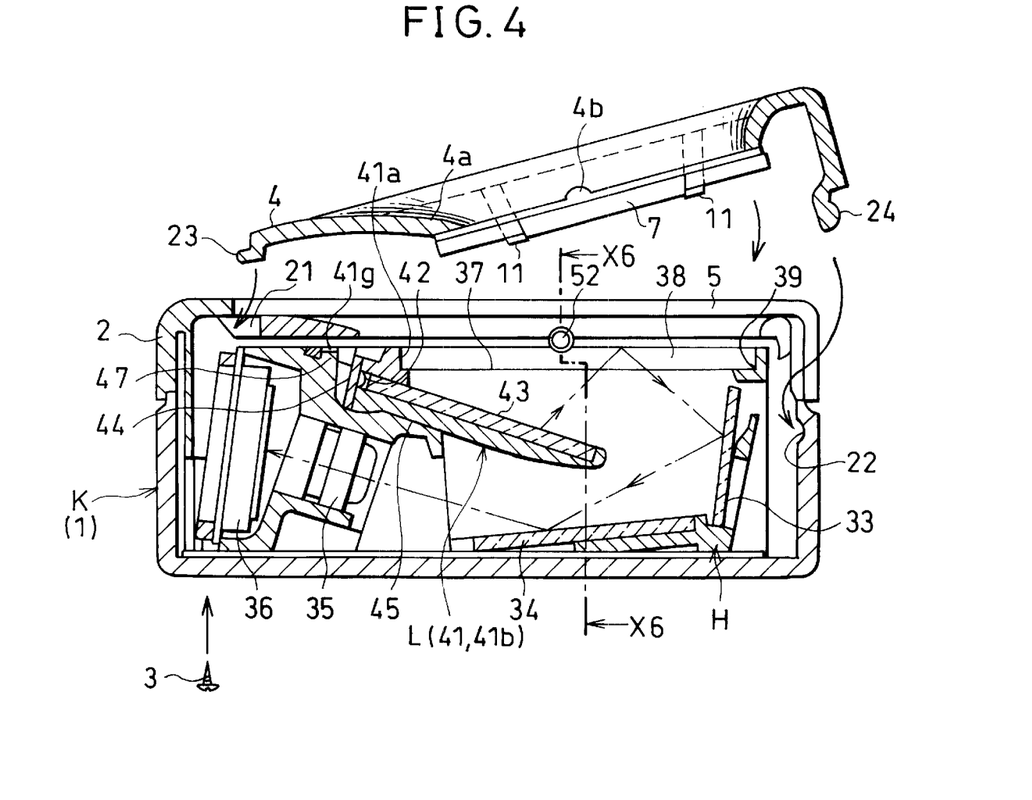
FIG. 4 is a cross-sectional view corresponding to line X4—X4 of FIG. 1.
Figure 5:
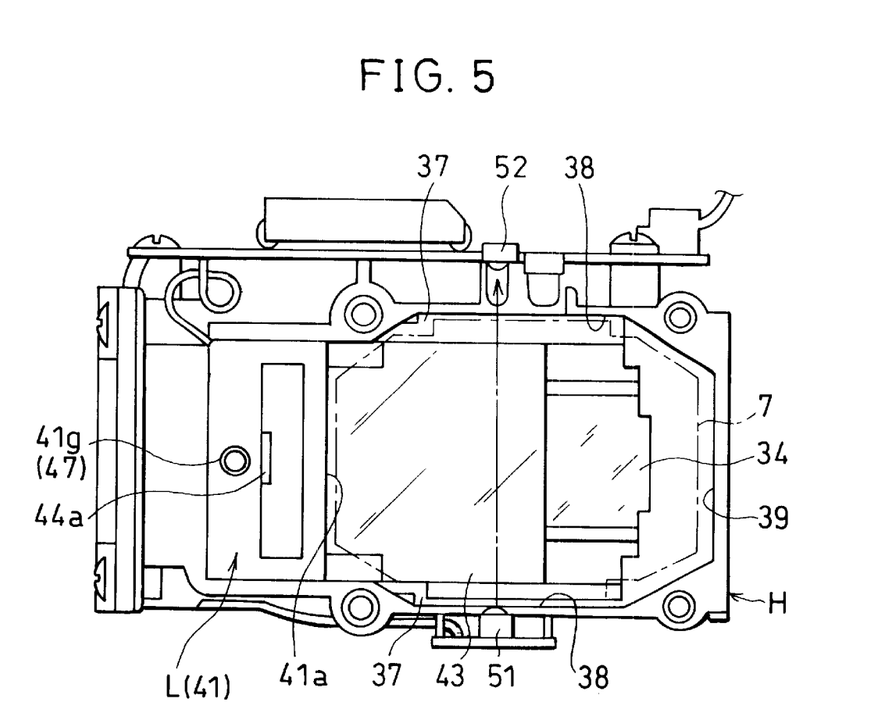
FIG. 5 is a plan view of the holding body fitted in the case and the components mounted therein.
Figure 6:
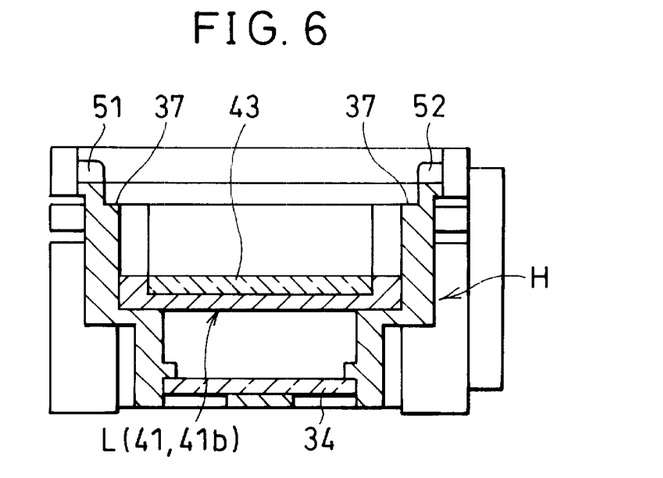
FIG. 6 is a cross-sectional view corresponding to X6—X6 of FIG. 4 in a condition with the case removed.
Figure 7:
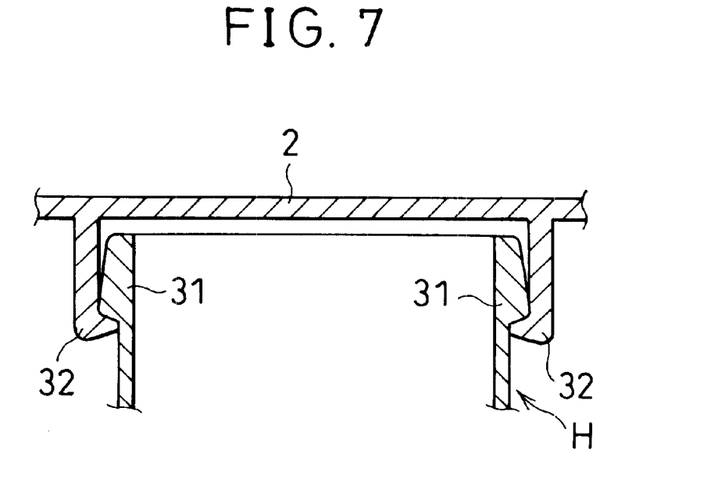
FIG. 7 is across-sectional view of a principal part showing the coupled condition of the upper case and holding body.
Figure 8:
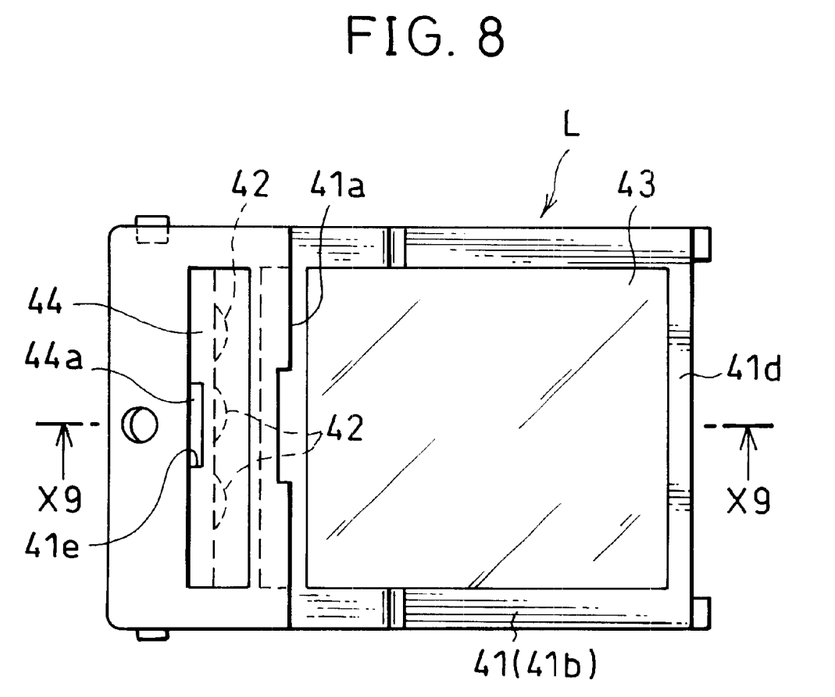
FIG. 8 is a plan view of the light source device.
Figure 9:
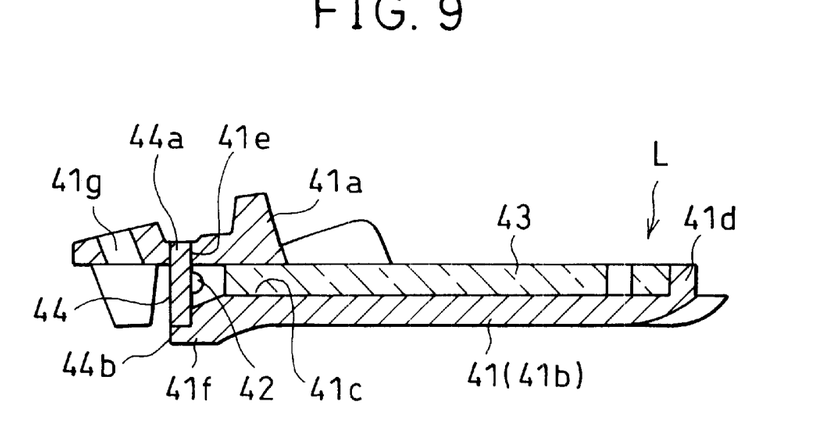
FIG. 9 is a cross-sectional view corresponding to the line X9—X9 of FIG. 8.

Part of upper case 2 is constituted by a cover member 4. This cover member 4 is formed separately from upper case 2 by synthetic resin and constitutes a portion of fairly large area of the upper surface of upper case 2 and part of the side face thereof. This cover member 4 is freely demountable with respect to upper case 2 without employing a separate fixing element and an aperture 5 of shape corresponding to the shape of this cover member 4 is formed in upper case 2. Of course, this aperture 5 is covered by cover member 4 and, in the mounted condition in which aperture 5 is covered by cover member 4, the surface of the outer peripheral portion on cover member 4 is coplanar with respect to the surface of the inner peripheral portion of aperture 5.

An aperture 6 is formed in a portion of cover member 4 constituting the upper surface portion of upper case 2, this aperture 6 being covered by window member 7. Window member 7 is arranged on the inside of cover member 4 (the space side within case K), so that it is held in cover member 4 in a condition with aperture 6 covered, as will be described. Of course, the upper surface of this window member 7 is contacted by the fingertip.

Figure 1:
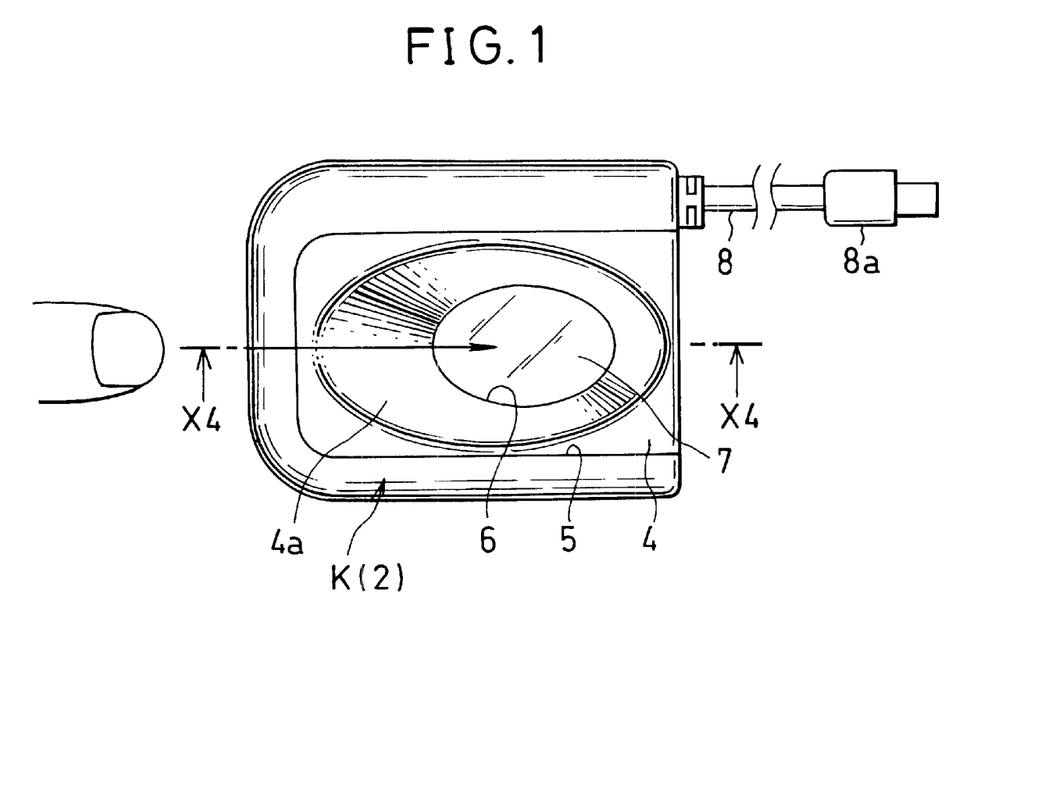
FIG. 1 is a plan view of a fingerprint recognition device to which the present invention has been applied.
Figure 2:
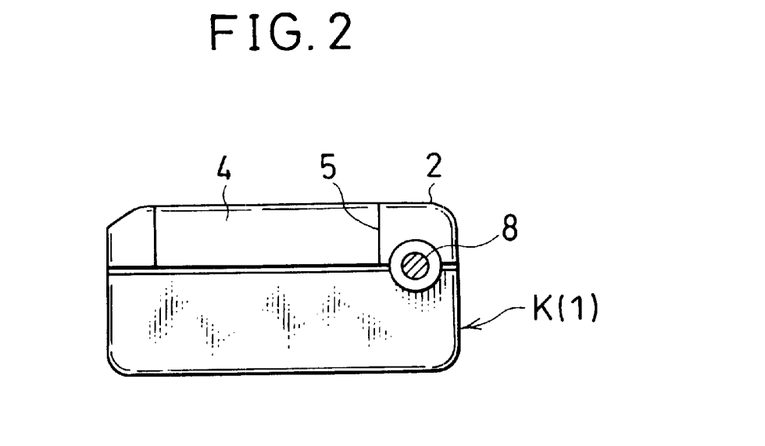
FIG. 2 is a right side view of FIG. 1.
Figure 3:
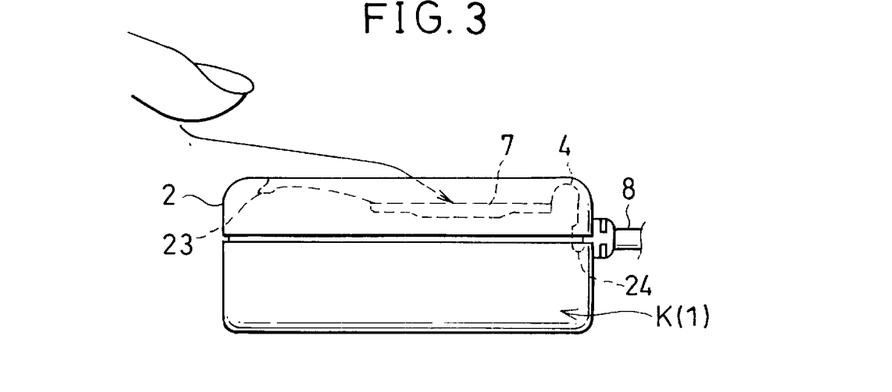
FIG. 3 is a left side view of FIG. 2.

As will be described, cover member 4 is freely demountably mounted from outside upper case 2 (case K) without employing any separate fixing element such as a screw. FIG. 1 to FIG. 3 show the mounted condition of cover member 4 with respect to upper case 2; FIG. 4 shows the condition in which cover member 4 is removed from upper case 2. Window member 7 is held in cover member 4, so, by removing cover member 4 from upper case 2, window member 7 is removed from upper case 2 together with cover member 4. Likewise, cover member 7 is mounted on upper case 2 by mounting cover member 4 on upper case 2.

The set of cover member 4 and window member 7 serve for replacement when window member 7 is soiled, and can be provided (sold) separately and independently from the other members. That is, when window member 7 is soiled, the set of the soiled old window member 7 and cover member 4 is removed from upper case 2, and a fresh set of window member 7 and cover member 4 may then be mounted on upper case 2. Of course, since only the set of window member 7 and cover member 4 is replaced, replacement can be effected at much lower cost in terms of the cost of the fingerprint recognition device as a whole. Of course, replacement of this set can be easily effected by the user himself.

As will be described, case K incorporates various elements used to obtain a signal corresponding to the fingerprint of the finger tip that is placed in contact with the window member 7, and the signal obtained is finally output as an electrical signal to the outside through connecting cable 8. Although in this embodiment the form of connecting cable 8, i.e. of the connecting terminal 8a thereof, is the USB (Universal Serial Bus) type, another type could be adopted.

Next, this embodiment of the present invention will be described in detail. First of all, details of the cover member 4 and window member 7 will be described with reference to FIG. 12 to FIG. 18. The peripheral portion of aperture 6 formed in cover member 4, which is of small thickness, is set to be inclined so as to be gradually raised further away from aperture 6 (this inclined face part is indicated by reference symbol 4a), so as to facilitate introduction of the fingertip into aperture 6 (i.e. window member 7). A plurality (in this embodiment, four) of holding feet (constituting holding parts) 11 are formed projecting from positions in the inside face of this cover member 4 close to aperture 6. These holding feet 11 are formed integrally with cover member 4, being elongate, such that they can be deformed sufficiently in resilient fashion. The four holding feet 11 are set in position such that they are positioned at the four corners of a rectangle. An engagement part for freely demountably mounting with respect to case K is formed on cover member 4; this aspect will be described later.

Figure 18:
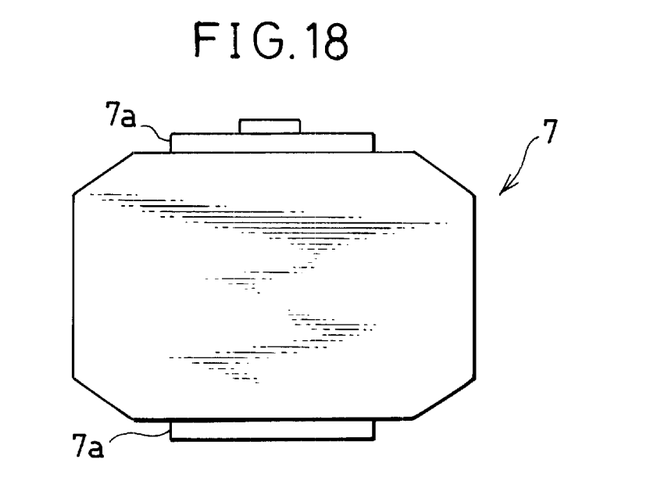
FIG. 18 is a plan view of the window member.

Window member 7 is formed as a thin plate by a transparent (optically transparent) member, its planar shape, as shown in FIG. 18, being formed in the shape of a rectangle with four corners cut away in inclined fashion. Projections 7a that project slightly are formed from each end face on the left and right (upwards and downwards directions in FIG. 18) of window member 7. This pair of left and right projections 7a extend for a comparatively long distance along the side faces of window member 7, but their ends are of a length that does not reach ends in the front and rear directions (left and right directions in FIG. 18) of window member 7. These projections 7a are integrally formed with window member 7.

Figure 17:
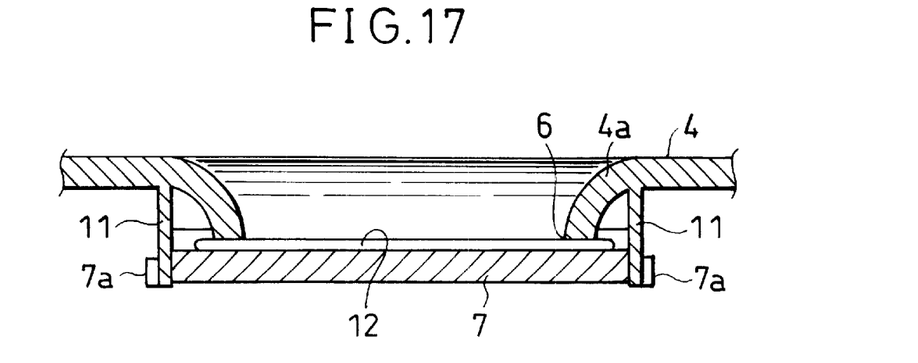
FIG. 17 is a cross-sectional view corresponding to line X17—X17 in FIG. 13.

The holding feet 11 formed on aforementioned cover member 4 are positioned at the ends in the longitudinal direction of the pair of left and right projections 7a on window member 7, so that window member 7 is resiliently held from the peripheral portion thereof. Claws are formed at the tips of holding feet 11, these claws being set such that they are positioned on the under-surface of window member 7, thereby further improving the holding function of window member 7. In the holding condition in which window member 7 is held by holding feet 11, the aperture 6 of cover member 4 is covered from the inside by window member 7. In this covered condition, a coating layer 12 (see FIG. 17) for improving the accuracy of detection of surface irregularities of the fingerprint (improving the definition of variations in optical intensity) consisting for example of a silicone film is formed on the surface of window member 7 that constitutes an upper surface. To indicate its presence more clearly, the thickness of coating layer 12 is shown exaggerated in FIG. 17 compared with its actual thickness.

In order to make cover member 4 freely demountable on upper case 2 without using a separate fixing element, as shown in FIG. 4, first abutment parts 21 and a second abutment part 22 are formed on case K. A pair of left and right first abutment parts 21 are formed in the form of an insertion aperture in the vicinity of one end of aperture 5 on the upper surface of upper case 2. Also, second abutment part 22 is formed in the form of a single recess on the inside face of the top of the side wall of lower case 1, in the vicinity of the end on the other side of aforementioned aperture 5. On cover member 4, there are integrally formed first engagement parts 23 corresponding to first abutment parts 21 and there are integrally formed second engagement parts 24 corresponding to second abutment parts 22. First engagement parts 23 are formed in the form of a pair of left and right tongues projecting from one end of cover member 4. Also, the tip of second engagement part 24 is formed in the form of a claw in the vicinity of the other end of cover member 4.

As shown in FIG. 4, mounting of cover member 4, with respect to case K, holding window member 7 is effected by inserting first engagement parts 23 thereof into first abutment parts 21 in a condition with cover member 4 somewhat inclined with respect to the upper surface of upper case 2. Next, mounting is completed by engaging second engagement part 24 in second abutment part 12 by rocking cover member 4 downwards about the vicinity of abutment part 11. Removal of cover member 4 from case K may be accomplished by a procedure opposite to that described above. Specifically, a certain degree of pressing force may be applied from outside at a position corresponding to second engagement part 24 of cover member 4, thereby putting second engagement part 24 into a condition separated from second abutment part 22 and rocking cover member 4 upwards, after which first engagement parts 23 may be withdrawn from first abutment parts 21. In this way, in this embodiment, it is arranged for mounting/demounting of cover member 4 with respect to case K to be performed by a 2-motion prescribed movement, but the prescribed movement of cover member 4 required for mounting/demounting (i.e. the selection of the construction of the abutment parts and engagement parts) could be suitably altered, for example, by arranging for mounting/demounting to be performed by a single motion involving sliding of cover member 4 with respect to case K, and so on.

Next, the details of the interior of case K will be described with reference to FIG. 4 to FIG. 11. First of all, in the interior of case K, a holding body H made of synthetic resin is fitted. This holding body H is formed with a claw-shaped engagement part 31 formed on the upper surface thereof and projecting from the inside face of upper case 2; this is fixed in a prescribed position within case K by engagement of the tip thereof with a claw-shaped abutment part 32. A light source device L, two first and second reflecting mirrors 33, 34, a lens 35 and an image pick-up element 36 are held in this holding body H. Light source device L comprises light-emitting elements 42 (in the embodiment these are LEDs but there is no restriction thereto) constituting a light source, and a light-guide plate 43 that diffuses the rays from light-emitting elements 42 widely in planar fashion; light-guide plate 43 directs rays of light in planar fashion on to window member 7 when this is in mounted condition. The reflected light from window member 7 is input from first mirror 33 through second mirror 34 to lens 35 and the reflected rays that have passed through this lens 35 are input to image pick-up element 36. Image pick-up element 36 converts variations in optical intensity of the reflected light that is input thereto into an electrical signal.

The upper surfaces of the walls of aforementioned holding body H on the left and right sides are constituted as supporting faces 37 that support window member 7. Specifically, the pair of left and right projections 7a of window member 7 when this is in the mounted condition are placed on supporting faces 37 so that window member 7 is firmly supported from below such that window member 7 is not displaced downwards even when window member 7 is subjected to pressure by a fingertip. Thus, in the mounted condition of window member 7, window member 7 is clamped by supporting faces, 37 and (the inner peripheral portion of the aperture 6) of cover member 4 such that window member 7 is not displaced in the vertical direction (plate thickness direction). Also, in holding body H, left and right-walls 38 and front wall 39 are formed that extend upwards somewhat higher than supporting faces 37 in the periphery of window member 7 when this is in mounted condition (supported by supporting faces 37). Furthermore, on a holder 41, to be described, in aforementioned light source device L, there is formed a rear wall 41a that extends upwards somewhat higher than supporting faces 37, so that the situation of window member 7, once this is in the mounted condition, being much displaced forwards or backwards or to the left or right is prevented by front and rear and left and right walls 38, 39, 41a constituting stop elements.

Light source device L is described in detail with reference to FIG. 4 to FIG. 11. Light source device L is provided with a holder 41 formed of synthetic resin. The holder 41 holds, apart from light-emitting elements 42 and light-guide plate 43 mentioned above, a substrate 44 for the light-emitting elements 42. Holder 41 comprises a supporting plate 41b that is shaped as a practically flat plate; light-guide plate 42 is placed on this support plate 41b. An aperture 41c of small depth is formed at the rear end (left side in FIG. 9) of holder 41; the rear end of light-guide plate 43 is fitted without rattling into this aperture 41c. Furthermore, the front end of supporting plate 41b constitutes a stop wall 41d that extends for a short distance upwards, so as to restrict displacement of light-guide plate 43 in the forward direction.

Figure 10:
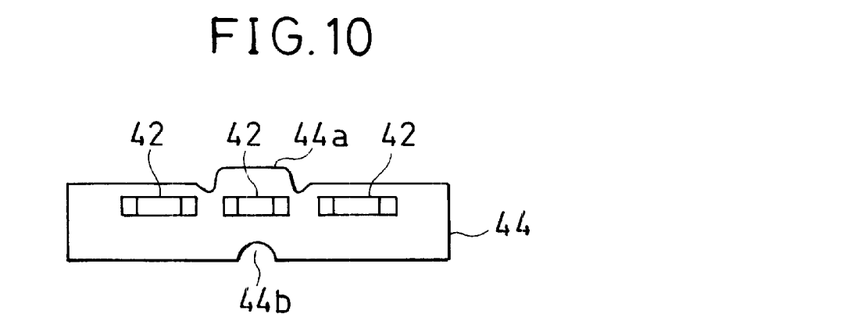
FIG. 10 shows the light source substrate seen from the right in FIG. 9.

Substrate 44 is held in holder 41 further rearwards than light-guide plate 43. As shown in FIG. 10, an abutment projection 44a is formed on the upper face of substrate 44, this abutment projection 44a being fitted without rattling into abutment aperture 41e that is formed at the base end of holder 41. Also, a cut-away aperture 44b is formed in the bottom end face of substrate 44, an abutment projection 41f projecting a short distance rearwards from holder 41 being fitted into this cut-away aperture 44b. In this way, a plurality (in this embodiment, three) of light-emitting elements 42 are mounted with separations in the left and right directions (in the direction along the rear end face of light-guide plate 43, vertical direction in FIG. 8) on substrate 44 that is held in holder 41. These light-emitting elements 42 are positioned near the rear end face of light-guide plate 43 and emit light towards the rear end face of light-guide plate 43.

Figure 11:
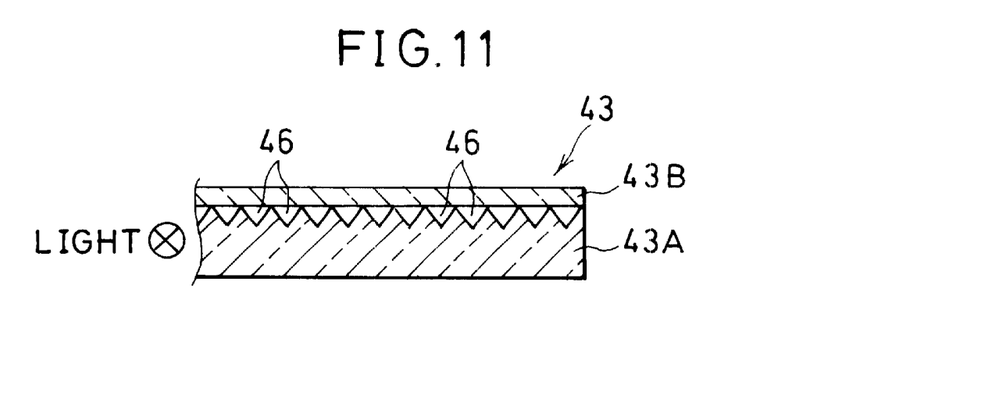
FIG. 11 is a cross-sectional side view of the principal part showing the light-guide plate.
Figure 12:
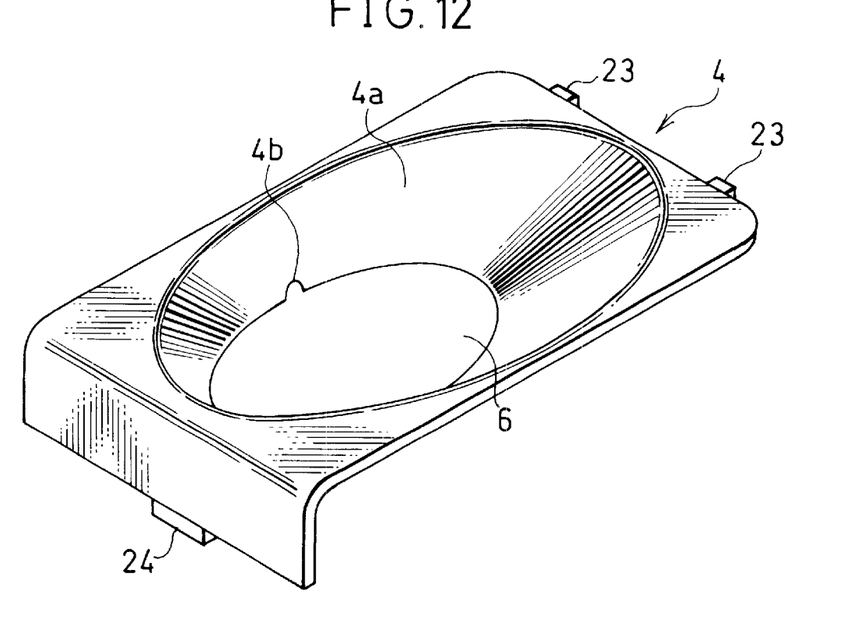
FIG. 12 is a perspective view of the cover member.
Figure 13:
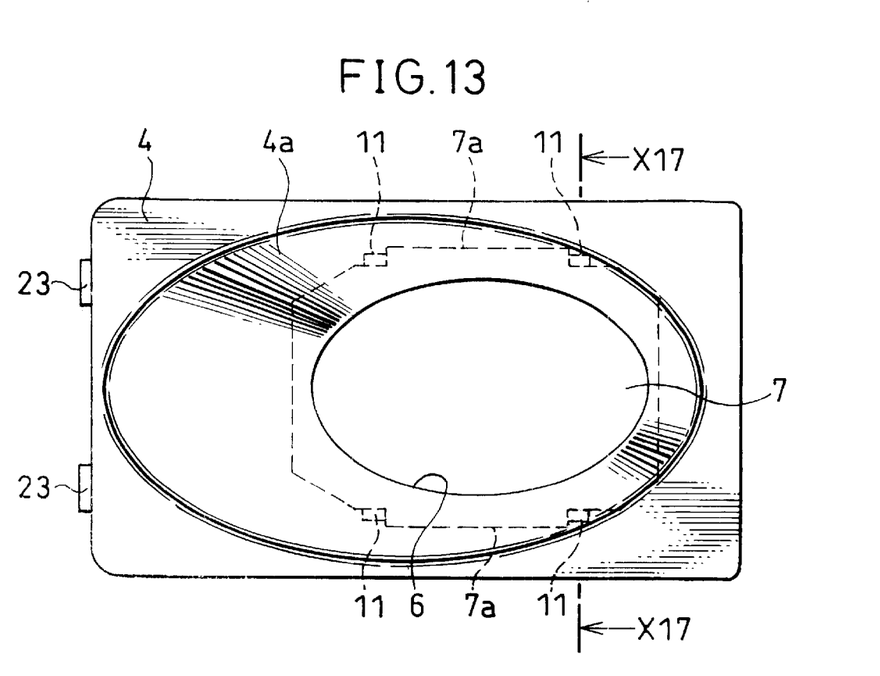
FIG. 13 is a plan view of the set of cover member and window member.
Figure 14:
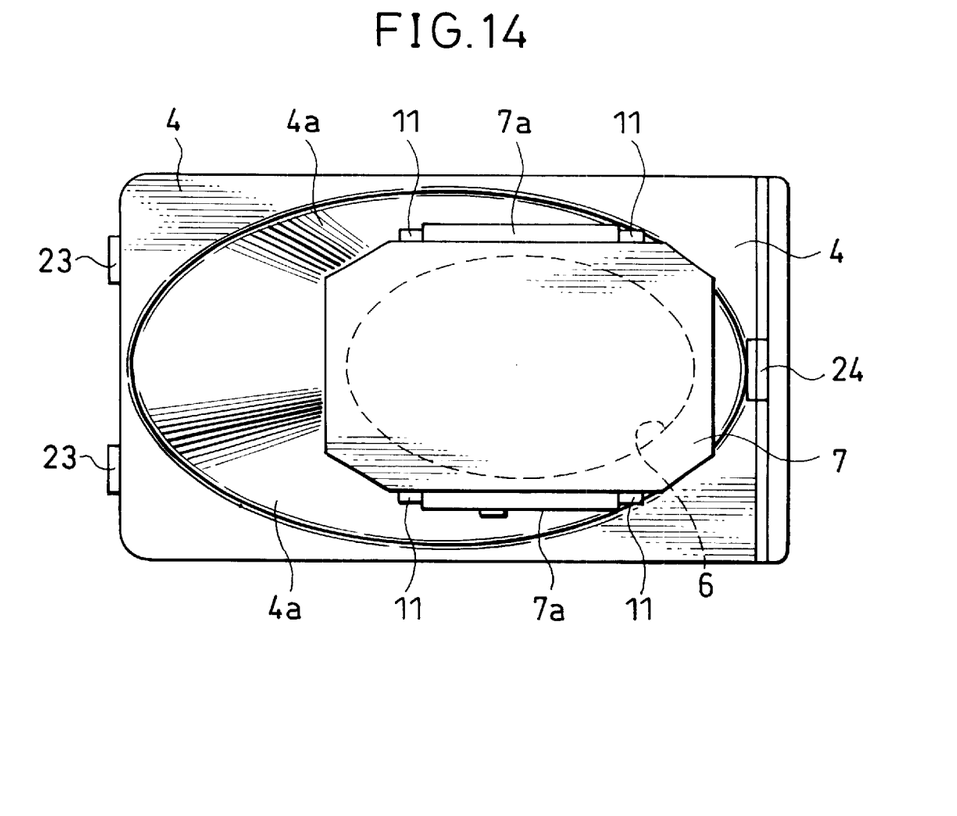
FIG. 14 is a rear view of the set of cover member and window member.
Figure 15:
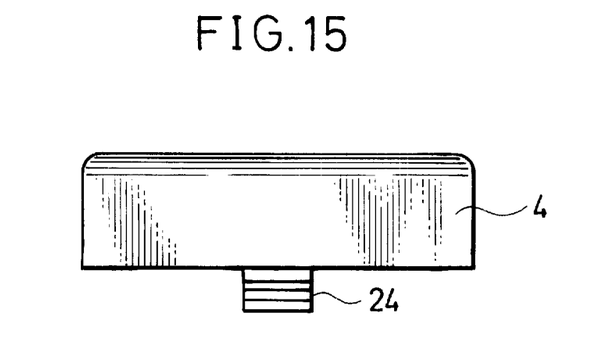
FIG. 15 is a right side view of FIG. 13.
Figure 16:
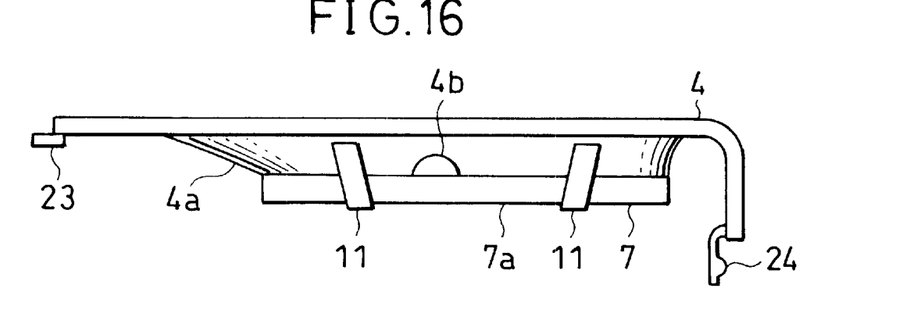
FIG. 16 is a left side view of FIG. 15.

As shown in FIG. 11, light-guide plate 43 comprises respectively a main plate 43A comprising an optically transparent member and a surface plate 43B integrated with the upper surface of main plate 43A. Fine grooves 46 are formed practically along the entire surface on the upper surface of main plate 43A. These grooves 46 serve to disperse the rays of light that are input from light-emitting elements 42 widely in planar fashion. A multiplicity of such grooves are formed extending in a direction practically parallel with the direction of receiving light from light-emitting elements 42, and being spaced in a direction approximately perpendicular to the light receiving direction; a large number of these grooves are formed along the light-receiving direction. By means of this surface plate 43B, the light rays that are widely dispersed by main plate 43A are rectified so as to constitute uniform rays emitted in a prescribed direction.

Holder 41 is placed and supported on a holding part 45 that is formed in holding body H along the internediate part thereof from its rear end in the forwards/rearwards direction (left/right direction in FIG. 4). In holder 41, further rearwards than substrate 44, there is formed an abutment hole 41g that extends practically in the vertical direction; an abutment projection 47 that extends for a short distance in the vertical direction and is formed on holding body H is tightly fitted into this abutment hole 41g (see FIG. 4). Holder H holds lens 35 directly below aforementioned holding part 45, and holds pickup element 36 directly to the rear of this lens 45. First reflecting mirror 33 is arranged on the line of extension of light-guide plate 43 below window member 7 when this is in mounted condition. Second reflecting mirror 34 is arranged at a lower position such that it is positioned below window member 7 when this is in mounted condition. Since light-guide plate 43 is of small thickness, the light-guide plate 43 can be arranged with a surface thereof disposed in spaced relation to the window and close to the window member 7 and, therefore, the overall length of case K in the vertical direction can be set to a small value.

Light-guide plate 43 is arranged in inclined fashion with respect to window member 7 when this is in mounted condition and directs the light rays from the inclined direction towards window member 7; since such directing from the inclined direction is performed, first reflecting mirror 33 is arranged in the direction of extension of light-guide plate 43. That is, the space between light-guide plate 43 and first reflecting mirror 33 constitutes (part of) a reflected ray path from first reflecting mirror 33 to second reflecting mirror 34, the arrangement being such that the reflected light from the second reflecting mirror 34 is made to practically coincide with the direction of inclination of light-guide plate 43 and the reflected light is input to lens 35 arranged below light-guide plate 43. In addition to the fact that the holding body H holds the optical engine, specifically the light source 42, light-guide plate 43, reflecting mirrors 33 and 34, image pick-up lens 35, and image pick-up element 36, the window member 7 is supported by the supporting faces 37 of the holding body H, and, therefore, the positional relationship among these elements can be kept with high precision, which is desirable for performing an accurate fingerprint comparison.

In order to ascertain whether or not a fingertip is in contact with the window member 7, a light-emitting element 51 (in the embodiment an LED) is arranged at the top of the left side-wall in holding body H, and a photodetector element 52 is arranged on the line of extension of light-emitting element 51 at the top of the right side-wall. The height positions of these elements 51, 52 are arranged somewhat higher than the upper surface of window member 7 when this is in mounted condition. The presence of a fingertip is ascertained by the fact that when a fingertip is in contact with window member 7 the light rays from light-emitting element 51 are cut off and are not input to photodetector elements 42. A pair of left and right cut-away apertures 4b are formed (see FIG. 4, FIG. 12, FIG. 16) on the line joining aforementioned light-emitting element 51 and photodetector element 52 on the inner peripheral portion of aperture 6 in cover member 4, so that detection of the fingertip is not obstructed by cover member 4.

Figure 19:
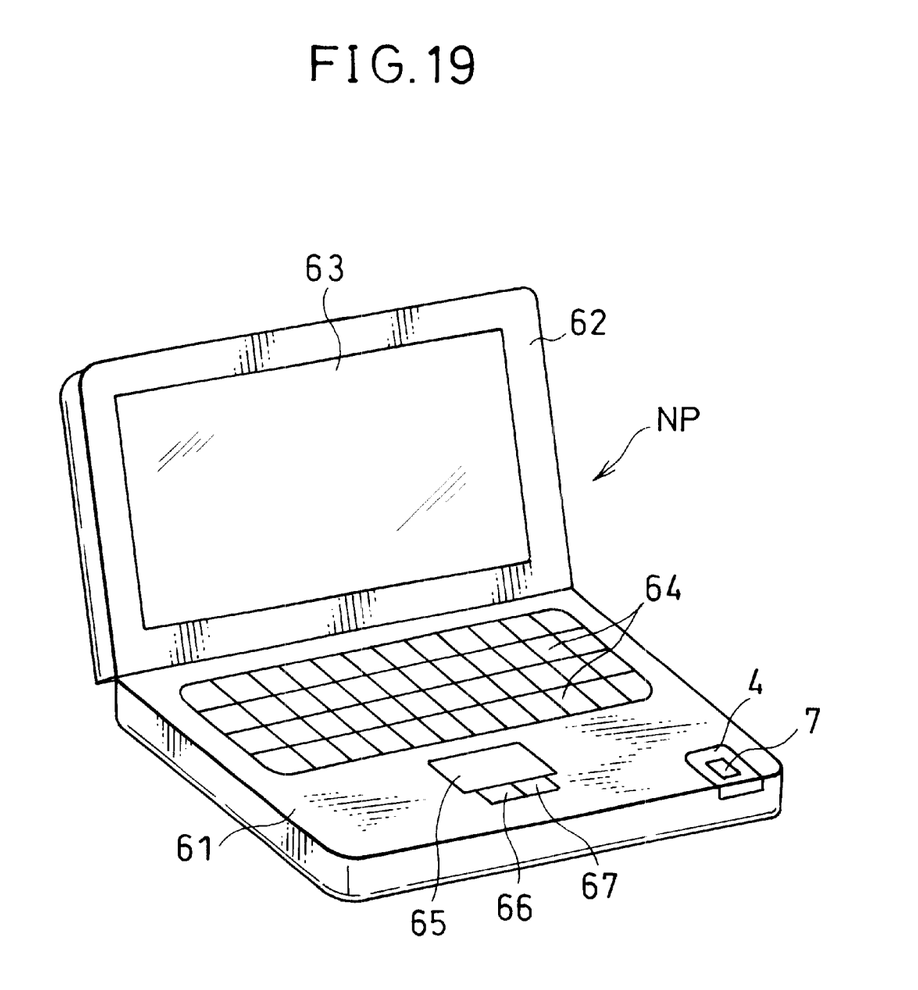
FIG. 19 is a perspective view showing an example of a notebook personal computer in which the fingerprint recognition device is incorporated.

FIG. 19 shows an example of a situation where the case of a fingerprint recognition device also serves as case 61 for the keyboard of a notebook personal computer NP. Specifically, in notebook personal computer NP, a fingerprint recognition device is employed instead of a password for confirmation of the identity of the authorized person. In FIG. 19, 62 denotes a cover-side case having a display 63, 64 denotes various keys, 65 denotes a mouse pad, and 66 and 67 denote click keys. Keyboard case 61, having the above keys 64, mouse pad 65 and click keys 66, 67, is employed as the case K of the fingerprint recognition device described above cover member 4 constitutes part of keyboard case 61. Of course, the various components for the fingerprint recognition device as shown in FIG. 4 that are arranged below cover member 4 are fitted in keyboard case 61 (however, connecting cable 8 is unnecessary). Of course, the present invention could also be applied to desktop personal computers or other information processing devices apart from notebook personal computers.

What is the claimed is:

1. A fingerprint recognition device comprising:
   a case defining an outer shell of said fingerprint recognition device,
   said case including a window member for fingerprint reading,
   said window member having an optically transparent member forming a separate element of said case,
   said window member being removably mounted to said case from outside said case; and
   a cover member having an aperture,
   said aperture being covered by said window member,
   said window member connected to said cover member,
   said cover member formed as a separate element of said case,
   said cover member being freely attachable and removable with respect to said case from outside said case, and said window member being capable of being removed from outside said case by removing said cover member from said case.

2. The fingerprint recognition device according to claim 1, wherein a holding part for holding said window member is formed on said cover member.

3. The fingerprint recognition device according to claim 1, wherein a supporting face that supports said window member is constituted in said case, said window member being arranged in said case in a condition clamped by said supporting face and the cover member.

4. The fingerprint recognition device according to claim 1, wherein a plurality of abutment parts are formed on said case, a plurality of engagement parts that are freely engageable and releasable with respect to said abutment parts being formed on said cover member, this cover member being put in mounted condition with respect to this case by engagement of these engagement parts and abutment parts.

5. The fingerprint recognition device according to claim 1, wherein said case is a keyboard case in an information-processing device.

6. A fingerprint reading window construction comprising a window member made of an optically transparent member and a cover member formed with an aperture covered by this window member, wherein an engagement part for mounting this cover member is formed on said cover member said cover member having an aperture that is covered by said window member and that is formed as a separate element from a case, said cover member being freely attachable and removable with respect to said case from outside said case, and said window member being capable of being removed from outside said case by removing said cover member from said case.

7. The fingerprint reading window construction according to claim 6, wherein a holding part for holding said window member is formed on said cover member.

8. The fingerprint reading window construction according to claim 7, wherein said holding part is constituted as a plurality of holding feet that are formed projecting from the inside surface of said cover member and that resiliently hold the peripheral portion of said window member arranged so as to cover said aperture from inside this cover member.

9. The fingerprint reading window construction according to claim 6, wherein a pair of left and right cut-away apertures are formed at the inner peripheral portion of said aperture in said cover member.

10. The fingerprint reading window construction according to claim 6, wherein said cover member is arranged to constitute part of a keyboard case in an information-processing device.

11. A fingerprint recognition device of the optical type constructed such that detection light rays from a light source are directed onto a window member for fingerprint reading, comprising a light-guide plate having a plate surface disposed in spaced relation to said window member and arranged such that said plate surface faces said window member, wherein the detection light rays from said light source are input from one end face of said light-guide plate, and said detection light rays are thereby turned into planar emitted light emitted from the entirety of said plate surface of said light-guide plate.

12. The fingerprint recognition device of claim 11, wherein said light-guide plate is arranged in inclined fashion with respect to said window member.

13. The fingerprint recognition device of claim 11, wherein said light-guide plate comprises a main plate and a surface plate arranged on the surface of the plate face of this main plate facing said window member, and a multiplicity of grooves extending in a direction approximately parallel with the input direction of the detection rays from said light source is formed in the surface of said main plate, while being spaced from one another in a direction approximately perpendicular to the input direction of the detection light rays.

14. The fingerprint recognition device according to claim 12, wherein said light-guide plate is arranged in inclined fashion such that the distance thereof, moving from said one end face—where said detection light rays are input—to the other end face, from said window member, is gradually increased;

an image pick-up element and an image pick-up lens for this image pick-up element are arranged below said light source and said light-guide plate; and a predetermined space onto which said window member faces is formed in the direction of extension of said light-guide plate towards said other end face, the predetermined space constituting an optical path for directing the detection light rays reflected by said window member from the light-guide plate to said image pick-up lens.

15. The fingerprint recognition device according to claim 14, wherein a first reflecting mirror for reflecting said detection light rays reflected from said window member is arranged in the direction of extension of said light-guide plate from said other end face; and a second reflecting mirror, for reflecting said detection light rays reflected by said first reflecting mirror towards said image pick-up lens, is arranged below the light-guide plate.

16. The fingerprint recognition device according to claim 15, wherein a holding body is arranged below the window member, and said holding body holds the light source, light-guide plate, image pick-up element, image pick-up lens, first reflecting mirror and second reflecting mirror.

17. A fingerprint recognition device of the optical type constructed such that detection light rays from a light source are directed onto a window member for fingerprint reading comprising an optically transparent member, and detection light rays reflected by the window member are input to an image pick-up element; wherein said window member is formed as a separate element from a case constituting the outer shell of the fingerprint recognition device and is attached removably to said case from outside the case;

a light-guide plate is provided such that the plate surface faces said window member; and the detection light rays from said light source are input from one end face of said light-guide plate, and said detection light rays are thereby turned into planar emitted light emitted from the entire plate surface of this light-guide plate.

18. The fingerprint recognition device according to claim 17, wherein a part of said case is constituted by a cover member having an aperture that is covered by said window member and that is formed as a separate element from this case, said cover member being freely attachable and removable with respect to this case from outside said case, and said window member being capable of being removed from outside this case by removing said cover member from said case.

19. The fingerprint recognition device according to claim 18, wherein said light-guide plate is arranged in inclined fashion such that the distance thereof, moving from said one end face—where said detection light rays are input—to the other end face, from said window member, is gradually increased;

said image pick-up element and image pick-up lens for this image pick-up element are arranged below said light source and said light-guide plate; and a predetermined space onto which said window member faces is formed in the direction of extension of said light-guide plate towards said other end face, the predetermined space constituting an optical path for directing the detection light rays reflected by said window member from the light-guide plate to said image pick-up lens.

20. The fingerprint recognition device according to claim 19, wherein a first reflecting mirror for reflecting said detection light rays reflected from said window member is arranged in the direction of extension of said light-guide plate from said other end face;

a second reflecting mirror, for reflecting said detection light rays reflected by said first reflecting mirror towards said image pick-up lens, is arranged below the light-guide plate;

a holding body is arranged below said window member; and said holding body holds the light source, light-guide plate, image pick-up element, image pick-up lens, first reflecting mirror and second reflecting mirror.

21. The fingerprint recognition device according to claim 20, wherein said holding body is integrated with the case to which said cover member is attached removably.

22. The fingerprint recognition device according to claim 20, wherein said holding body is formed with a supporting face for supporting said window member, and said window member is immovably clamped between said supporting face and said cover member in a condition where said cover member is attached to said case.

23. The fingerprint recognition-device according to claim 18, wherein said light-guide plate comprises a main plate and a surface plate arranged on the surface of the plate face of this main plate facing said window member, and a multiplicity of grooves extending in a direction approximately parallel with the input direction of the detection rays from said light source is formed in the surface of said main plate, while being spaced from one another in a direction approximately perpendicular to the input direction of the detection light rays.

24. The fingerprint recognition device according to claim 17, wherein said case is the keyboard case in an information-processing device.

25. A fingerprint recognition device comprising:

a case of said fingerprint recognition device having an outer shell including a cover member with an aperture therein; and a discrete window having a transparent member adapted to receive a finger on a surface thereof, said window removably externally coupled to said case by said cover member said, window member connected to said cover to cover said aperture and adapted to be removed outwardly from said case following removal of said cover member.

* * * * *